Oct. 18, 1955     C. R. BURGESS     2,721,254
ELECTRIC HOT AIR HEATER
Filed Feb. 12, 1953     2 Sheets-Sheet 1
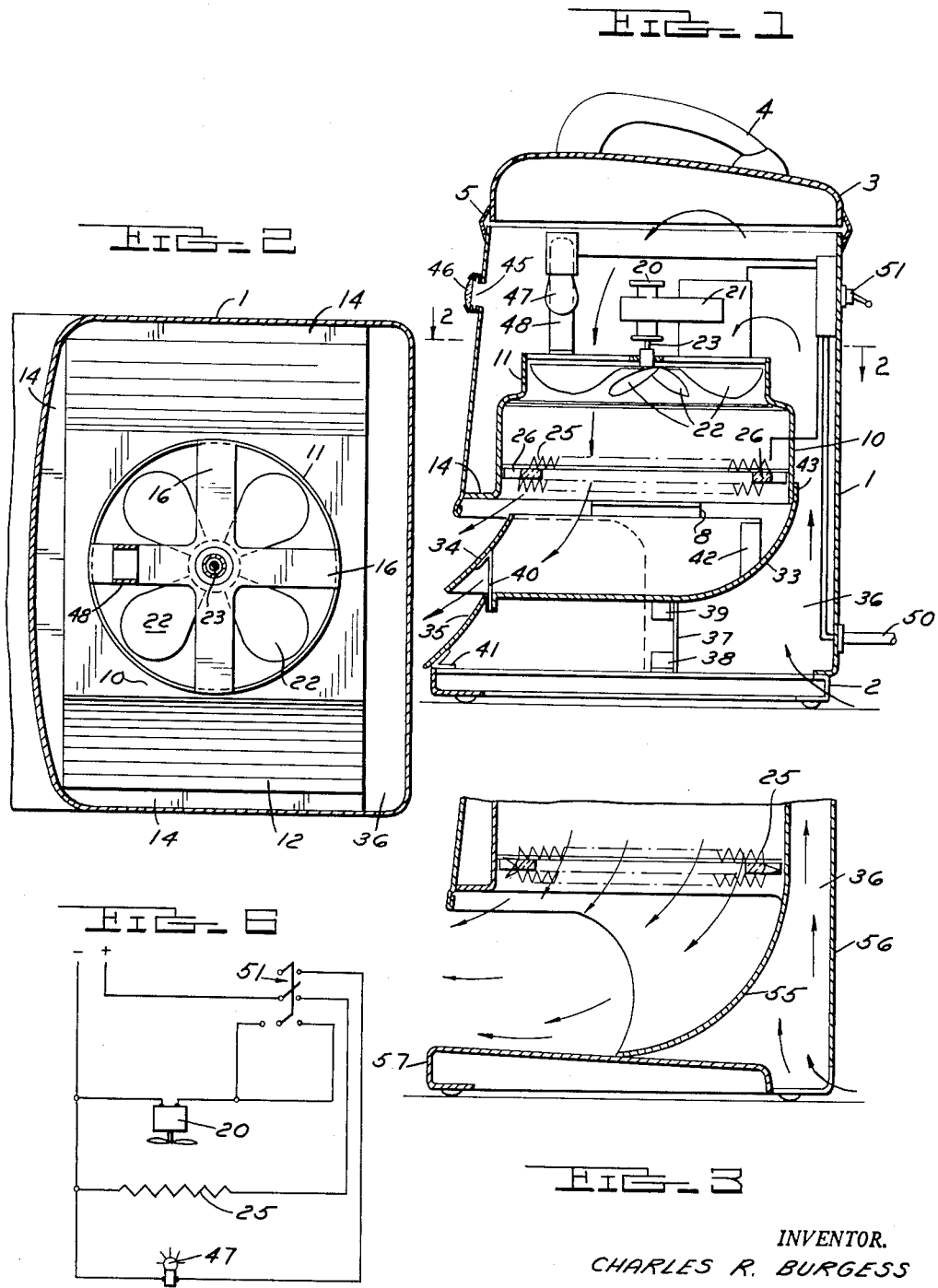
INVENTOR.
CHARLES R. BURGESS
BY
Barnes, Kisselle, Laughlin & Raisch
ATTORNEYS Oct. 18, 1955
C. R. BURGESS
2,721,254
ELECTRIC HOT AIR HEATER
Filed Feb. 12, 1953
2 Sheets-Sheet 2
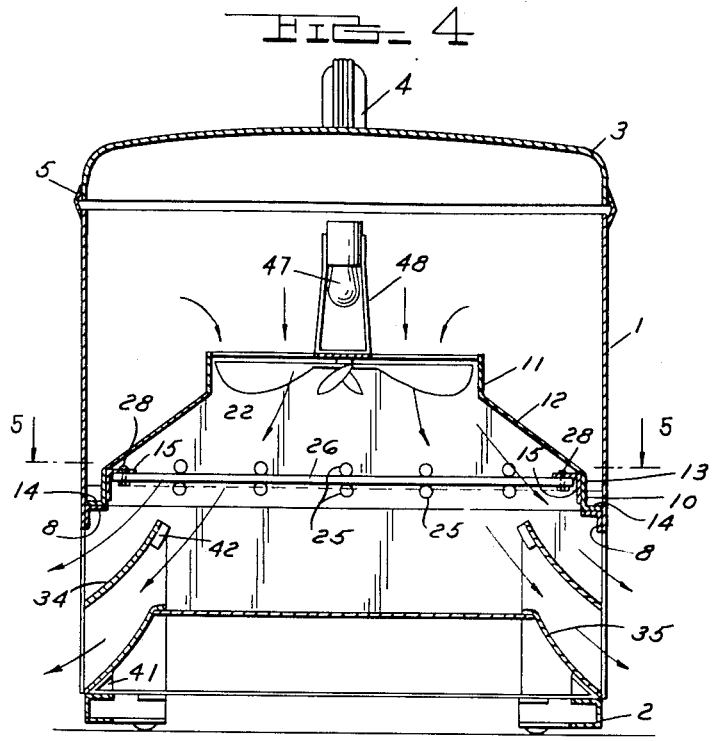
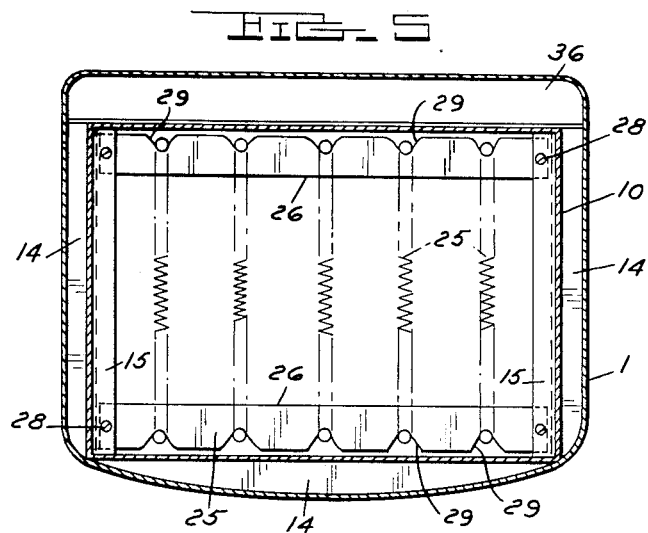
INVENTOR.
CHARLES R. BURGESS
BY
Barnes, Kisselle, Laughlin & Raisch
ATTORNEYS

United States Patent Office 2,721,254
Patented Oct. 18, 1955

2,721,254

ELECTRIC HOT AIR HEATER

Charles R. Burgess, Detroit, Mich.

Application February 12, 1953, Serial No. 336,610

2 Claims. (Cl. 219—39)

This invention relates to an electric hot air heater which is particularly adapted for use as a portable unit.

The purpose of this invention is to provide a portable type electric hot air heater which is very efficient and simple to operate and which is adapted for very economical manufacture. Generally the device has an outer casing or housing within which is mounted a number of electrical resistant type heating filaments, a number of baffles and various accessory members. The baffles are so arranged that cool air is drawn into the casing and moved past the fan and the heating element and so that the heated air is projected in a generally horizontal direction along the floor or other surface supporting the unit.

The heater is so constructed that during operation all of the exposed parts are kept sufficiently cool to eliminate the possibility of any serious burn resulting from contact therewith. The unit is also adapted for use in the summer time as a fan to circulate cool air. In one form of the invention the baffles or louvers directing the flow of heated air leaving the heater also serve as reflecting type heaters. Two embodiments of the invention are shown in the accompanying drawings:

Fig. 1 is a side view partly in section of the entire device, the direction of flow of air therethrough being shown by arrows.

Fig. 2 is a plan view taken on line 2—2 of Fig. 1.

Fig. 3 shows a modification of the invention in which a single baffle replaces the baffles and louvers shown in Fig. 1.

Fig. 4 is a front view partly in section of the entire heater.

Fig. 5 is a plan view taken on line 5—5 of Fig. 4.

Fig. 6 is a diagram showing the electrical circuit connecting the various electrical members of the heater.

The heater has an outer casing or housing which includes a body portion 1 with a base portion 2 secured thereto and a top or cover 3 removably secured thereto by suitable means such as screws. The cover 3 has a handle 4 by which the entire heating unit may be carried. A decorative band or hoop 5 may be provided to conceal the juncture of the body portion 1 and the cover 3. The outer housing or casing is preferably made of sheet metal. Two or more brackets 8 are secured by suitable means such as spot welding to the interior of the body portion 1 of the housing as shown in Fig. 4. Supported within the housing by means of the brackets 8 is a duct 10 which also serves as a frame upon which is mounted a fan 20 and a heating element 25. The upstream end portion of the duct is circular as shown at 11 while the contiguous portion lying downstream is rectangular and conical outwardly flaring as shown at 12. Downstream of the flared portion is another portion 13 with sides substantially parallel to the axis of the duct and extending outwardly from the portion 13 are flanges 14, portions of which are secured to the brackets 8. The flanges 14 also serve as baffles to prevent the flow of air between the duct 10 and the body 1 of the outer housing.

Extending inwardly from the portion 13 of the duct are flanges such as shown at 15 to which the heating element 25 may be secured. Across the upstream end of the circular projection 11 are two cross members 16 which provide a mounting for the fan 20. The duct or frame 10 is preferably made of sheet metal. The fan unit generally indicated at 20 is of a standard inexpensive commercially available type having an electric motor 21, fan blades 22, and a drive shaft 23. As indicated in Figs. 1 and 2 the clearance between the fan blades and the inner surface of the projection of 11 is relatively small.

A heating element, as best shown in Fig. 5, comprises a series of electrical resistance filaments 25 and two supporting bars 26 of an electrical nonconductor such as an asbestos board. The filaments may be provided by a single continuous length of wire wrapped alternately about one bar and then the other. The wire is preferably of the coiled type. The bars 26 are secured to the inwardly extending flanges 15 of the hood or frame 10 by suitable means such as by the bolts 28. The outer edge of each bar or support 26 is provided with a series of notches or recesses 29. The coiled wire providing the filaments 25 is secured to the bars merely by wrapping it alternately around the bars and snugly engaging it in the recesses 29 therein.

Baffles 33, 34, and 35 direct the flow of heated air emerging from the heater and together with portions of the frame 10 and the body member 1 provide a cold air inlet duct 36 adjacent the rear face of the heater. The baffle 33, including flange portions 37 thereof, forms a partition which prevents the intermingling of heated air leaving the heater and cool air being drawn into the heater and which constitutes a part of the inner wall of the duct 36. Brackets 38 secure the flanges 37 and portions of the baffle or louver 35 to the base portion. The baffle 35 is also secured to the baffle 33 by means of brackets 39 and 40. The front edge of the louver 35 is secured to the base portion 2 by means of brackets such as shown at 41. The brackets 40 also serve to secure the baffles 33, 34 and 35 together as shown and baffle 34 is further secured to the baffle 33 by means of brackets such as shown at 42. The various baffles are thus secured firmly to each other and are secured firmly into position relatively to the outer casing. The duct 10 and the baffle 33 are adapted to engage each other in an overlapping joint as shown at 43 which is sufficiently tight to prevent the flow of air therethrough, thereby maintaining the continuity of the intake duct 36. The louvers 34 and 35 are adapted to direct the heated air outwardly from the heater and further, the obverse faces of these louvers are preferably adapted to reflect heat radiated from the heating filaments 25 outwardly from the heater.

An aperture 45 is provided in the outer housing of the heater and a translucent indicator jewel 46 covers the aperture. An electric indicator bulb or light 47 is mounted on the interior of the heater by means of a suitable bracket 48. This bulb is positioned to illuminate the indicator jewel and preferably also to illuminate the obverse faces of the louvers 34 and 35. The reverse face of the body portion 1 is apertured to permit an electrical conduit 50 to extend therethrough and is also apertured to permit an electrical switch 51 which may be of the toggle type to be mounted therein. The switch 51 is of the double throw type having three positions: an off position, one on position in which current flows only to the fan motor 21, and a second on position in which current flows to the fan motor 21, the heating filaments 25 and the electric light bulb 47. A diagram of a suitable electrical circuit is shown in Fig. 6. The electrical leads necessary for this circuit are indicated in Fig. 1.

In use the heater is carried by means of handle 4 to the desired location and the conduit or electric cord 50 is plugged into the desired electrical outlet. When the switch 51 is turned to the proper "on" position, electric current illuminates the light bulb 47, actuates the fan 20 and heats the filaments 25. The fan lifts cool air through the intake duct 36. The air then moves past the fan downwardly as viewed in the drawings, through the duct 10 and the heating filaments 25 where the air is heated. After leaving the duct 10 the heated air strikes the baffles 33, 34 and 35 and is thereby directed horizontally outwardly, close to the floor upon which the heater rests. The direction of flow of air is indicated by arrows in Figs. 1 and 4.

It will be noticed that air continually circulates past all exposed parts of the heater thereby keeping such parts cool enough so that no serious burn can result from contact therewith. Further, the fan motor is cooled by the continual current of cool air passing it. It is an important part of this invention that the cool air inlet duct is adjacent to the rear face of the outer casing of the heater so that the coolest parts of the heater are in the rear where heat is least likely to be needed and where a cool outer surface is especially desirable to preclude the possibility of scorching exterior objects which the heater may be inadvertently placed or pushed against. It is also an important part of this invention that the heating element is disposed forwardly of the cool air intake duct and that it is disposed generally horizontally. This positioning of the heating element permits the use of a generally conically shaped shroud, provided by portions of the duct 10, between the fan blades 22 and the heating element, which results in very efficient utilization of the heat produced by the heated elements. At the same time, this construction permits the overall size of the heater to be kept relatively small.

The air moving through the heating element keeps the filaments 25 cooled below their red heat temperature so that while heat radiating from the filaments is reflected by the louvers 34 and 35 they are not illuminated by the filaments. Therefore, in order to produce the desired visual psychological suggestion of heat, the light bulb 47 is preferably colored red and is positioned so that its reflection may be seen in the louvers. It is also positioned to shine through the aperture 45 and illuminate the indicator jewel 46 when the switch 51 is turned to the on position. The cover 3 is easily removable for access to the interior of the heater and the heating unit comprising the fan, the duct 10, and the heating element may be removed from the outer housing merely by lifting it out. It should be understood however that screws may be utilized to secure the heating unit to the brackets 8.

If it is desired to use the device as a cooling unit, the switch 51 is turned to a selected "on" position which actuates the fan only without illuminating the bulb 47 and without heating the filaments 25. The operation of the unit is the same as above described except that air discharged therefrom is cool rather than heated.

In laboratory tests a heater of the type described has been operated continuously for a total of 1200 hours; no over-heating resulted and no mechanical defects appeared. The heater used in this test had a four blade, six inch fan driven by a 100 volt 60 cycle motor, filaments of No. 18 nickel-chrome wire, was rated at 1100 watts, and displaced air at the rate of 90 cubic feet per minute, raising the temperature of the air so moved by 95 to 100 degrees above the temperature of the air in the room in which it was used. The invention thus provides a portable heater of high efficiency, great durability, which is economical of operation and which is adapted for very inexpensive manufacture and introduction on the mass market. Furthermore the unit, being made largely of sheet metal, is adapted for attractive, modern product design. With regard to the latter, it may be noted that this heater is also the subject of an application for a design patent filed concurrently herewith.

In the modification of the invention shown in Fig. 3, a single baffle 55 replaces the baffles 33, 34 and 35 shown in Fig. 1. The outer housing or casing 56 is modified slightly from the body portion 1 of Fig. 1 in order to accommodate the baffle 55 and the base portion 57 is also slightly modified as shown to accommodate the baffle 55 and may be made integrally with the body portion 56. It will be appreciated that a heater made in accordance with this modification will be manufactured and sold to the consuming public at a lower cost than the heater shown in Figs. 1 and 4.

I claim:

1. A portable electric space heater unit comprising, an outer shell having a bottom inlet, a closed top and an outlet in the bottom portion of its wall, an inner shell spaced from the wall of said outer shell, said inner shell having an inlet vertically spaced from the top of the outer shell and having an outlet connected to said outlet of the outer shell, an electric heating element supported generally horizontally at an intermediate position within said inner shell, fan means within said inner shell and adjacent the inlet thereof, said fan means being adapted to move air upwardly through said inlet in the outer shell and around the walls of the inner shell to the top of the unit prior to its contact with the heating element, then downwardly through said inner shell, heating element, and outlet in the outer shell against the normal force of convection.

2. A portable electric space heater unit comprising, an outer shell having a bottom inlet, a closed top and an outlet in the bottom portion of its wall, an inner shell within said outer shell and spaced from the walls of said outer shell, at least portions of said inner shell and outer shell forming generally concentric ducts for the passage of air vertically in opposite directions, said inner shell having an inlet vertically spaced from the top of the outer shell and having an outlet connected to said outlet of the outer shell, an electric heating element supported generally horizontally at an intermediate position within said inner shell, fan means within said inner shell and above said heating element, said fan means being adapted to move air upwardly through said inlet in the outer shell, around the walls of the inner shell to the top of the unit prior to its contact with the heating element, then downwardly through said inner shell, heating element, and outlet in the outer shell against the normal force of convection, and baffle means in said outlet in the outer shell positioned to direct heated air generally horizontally outwardly of said heater unit.

References Cited in the file of this patent

UNITED STATES PATENTS

| | | |
|---|---|---|
| 1,644,595 | Karg | Oct. 4, 1927 |
| 1,908,559 | Roser | May 9, 1933 |
| 1,986,350 | Logan | Jan. 1, 1935 |
| 1,998,670 | Goshorn et al. | Apr. 23, 1935 |
| 2,445,250 | Steingruber | July 13, 1948 |
| 2,466,237 | Heiman | Apr. 5, 1949 |